United States Patent
Vaughan et al.

(10) Patent No.: US 7,366,199 B1
(45) Date of Patent: Apr. 29, 2008

(54) METHOD AND APPARATUS MEASURING BANDWIDTH

(75) Inventors: Gregory Vaughan, Santa Cruz, CA (US); Mythili Devineni, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 978 days.

(21) Appl. No.: 10/315,621

(22) Filed: Dec. 10, 2002

(51) Int. Cl.
*H04J 3/16* (2006.01)
(52) U.S. Cl. ..................................... 370/468
(58) Field of Classification Search ................ 370/468, 370/465, 473, 474, 412, 477, 471, 437, 400, 370/908, 252, 395.52, 395.4, 230.1, 229, 370/235, 395.21; 709/226, 229, 317, 316, 709/223, 238
See application file for complete search history.

(56) References Cited

U.S. PATENT DOCUMENTS 6,014,694 A * 1/2000 Aharoni et al. ............. 709/219
6,272,539 B1 * 8/2001 Cuomo et al. .............. 709/223

\* cited by examiner

*Primary Examiner*—Chi Pham
*Assistant Examiner*—Alexander O. Boakye
(74) *Attorney, Agent, or Firm*—Adeli & Tollen LLP

(57) ABSTRACT

For a network that connects several computers, a method of determining the network bandwidth between two computers. The method measures a first time interval between when one of the computers (1) sends a first data set to the other computer and (2) receives a first response. It also measures a second time interval between when one of the computers (1) sends a second data set to the other computer and (2) receives a second response. The method then identifies the network bandwidth from the two measured time intervals.

27 Claims, 3 Drawing Sheets

METHOD AND APPARATUS MEASURING BANDWIDTH

FIELD OF THE INVENTION

The present invention is directed towards method and apparatus for determining network bandwidth.

BACKGROUND OF THE INVENTION

Streaming server technology originally did not provide information about the available network bandwidth between servers and clients. Consequently, most servers often assumed that the bandwidth needed to stream content (e.g., movies) was available, and therefore sent Realtime Transport Protocol ("RTP") packets to clients at the data rate of the content. If the actual bandwidth was less than that required, the RTP packets that did not fit into the network pipe would be discarded or lost. In addition, prior streaming technology often did not have error detection or correction available in the transport protocol (UDP) that was used to transmit RTP packets.

More recent streaming technology provides more reliable transmission of RTP packets using the same UDP transport protocol. In this technology, the client performs error detection and sends acknowledgements for the RTP packets it received from the server. The server, in turn, considers packets that are not acknowledged as lost on the network, and retransmits unacknowledged packets, which facilitates error correction.

This current streaming technology allows the server to calculate approximate available bandwidth as time progresses. The server uses this information to decide whether to throttle the stream bandwidth or increase it. However, with this technology, it is not possible to determine the available network bandwidth at the start of the stream.

If a client connects to a stream that requires more bandwidth than available, the server is not able to intelligently stream the content so that it fits the network pipe. By the same token, if the client has excess bandwidth, the server is unable to take advantage of the additional bandwidth to stream the content faster, or over-buffer the RTP packets. Since it does not know the ratio of available bandwidth to the required bandwidth, it is unable to determine the over-buffer rate at the start of the content.

Both current and past technologies do not aid the server in sending the most optimum stream to the client. Current technology, which includes reliable UDP and over-buffering, provides considerably better control over the stream as it is able to detect lost packets and retransmit them. Yet, using this technology does not solve several problems. For instance, when a client connects to a movie stream that requires higher bandwidth than what is available, the server will try to stream the movie at its authored data rate. Since the data rate is greater than the available bandwidth, the resulting movie would have poor quality.

Also, clients cannot report the bandwidth based on network settings as the available bandwidth spans a wide range for broadband connections. For example, clients on DSL connections may have a bandwidth ranging anywhere from 300 kbps to 1.5 Mbps. In this case, unless the bandwidth is determined at the start of the stream, the client may access a stream that requires much more bandwidth than available. Alternatively, the client may access a stream that requires only a fraction of the available bandwidth but the server will not know this early enough in order to determine the over-buffer rate of the stream. Therefore, there is a need in the art for a method that can dynamically determine the network bandwidth between the server and the client at a start of a streaming session.

SUMMARY OF THE INVENTION

For a network that connects several computers, a method of determining the network bandwidth between two computers. The method measures a first time interval between when one of the computers (1) sends a first amount of data to the other computer and (2) receives a first response. It also measures a second time interval between when one of the computers (1) sends a second amount of data (that is different from the first amount) to the other computer and (2) receives a second response. The method then identifies the network bandwidth from the two measured time intervals.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

The invention is directed towards method and apparatus for determining network bandwidth. In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for determining the available network bandwidth between two computers. In the embodiments described below, one computer is a streaming server (i.e., a server that provides streaming content) while the other computer is a client computer of the server. However, one of ordinary skill will understand that other embodiments can be used to determine the bandwidth between any two computers.

Figure 1:
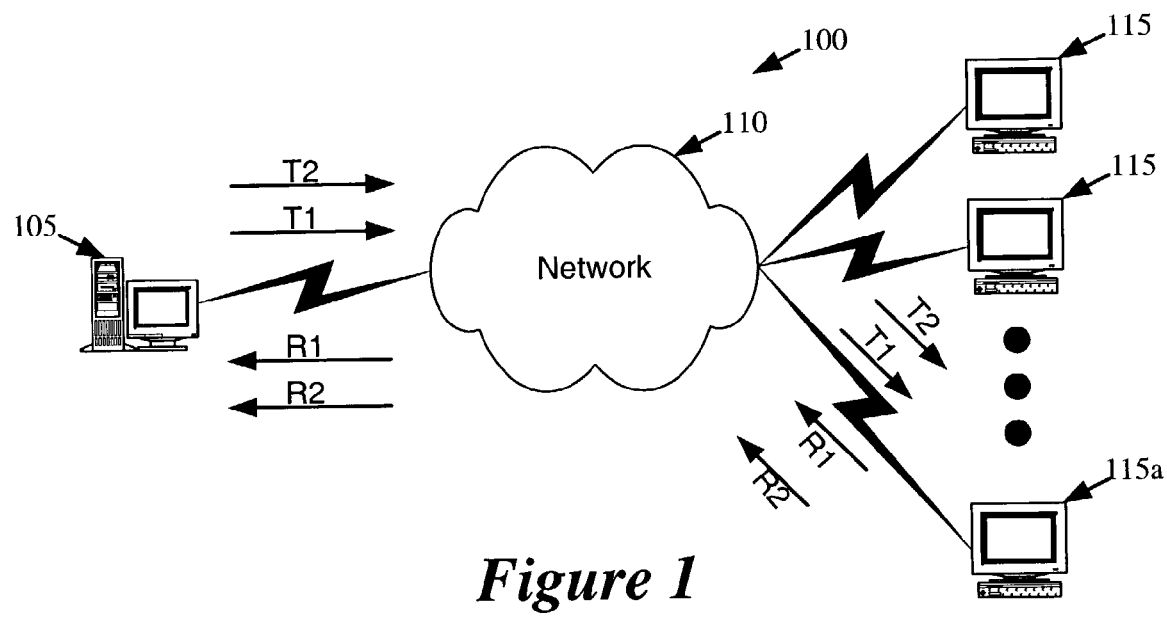
FIG. 1 presents a computer system that uses one embodiment of the invention.
Figure 2:
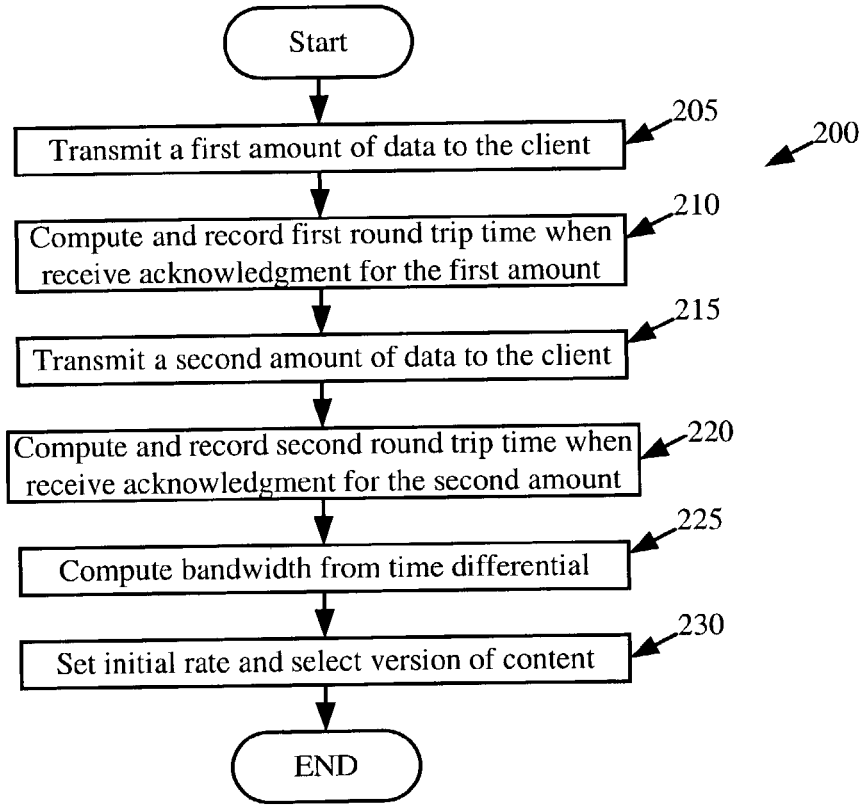
FIG. 2 presents a process performed by some embodiments of the invention.

Some embodiments calculate the available bandwidth based on round trip times of two consecutive sets of data sent by the server to the client at the start of the stream. FIGS. 1 and 2 illustrate one such embodiment. Specifically, FIG. 1 illustrates a computer system 100 that uses one such embodiment. This computer system includes a server 105, a network 110, and several client computers 115. In the embodiments described below, the network 110 is a network of networks, such as the Internet. In other embodiments, however, the network is a local area network ("LAN"), a wide area network ("WAN"), or some other type of network.

FIG. 2 illustrates a process 200 that the server 105 performs to calculate the available bandwidth. As shown in FIGS. 1 and 2, the server 105 initially transmits (at 205) a small data set (e.g., a small data packet) T1 to a client computer 115a. This set has M bytes. At 205, the server also records the time ($t_{T1}$) that it transmits the data set T1 to the client computer.

The client 115a responds to the data set T1 by transmitting a reply R1 to the server. The reply R1 is a short response of R bytes. When the server 105 receives the reply R1, it records (at 210) the time ($t_{R1}$). The interval between sending the first data set and receiving the first response is the round trip time for the first data set, $RTT_1$. Accordingly, from the recorded transmit and reply times, the server (at 210) computes the first round trip time $RTT_1$. The first round trip time equals the first reply time minus the first transmit time (i.e., $RTT_1 = t_{R1} - t_{T1}$). If the network bandwidth between the server and the client is B, then the time required to send M bytes of data is M/B. If the time it took to receive R bytes of data from client is $r_k$, then $$M/B + r_k = RTT_1. \quad (1)$$

After 210, the server then transmits (at 215) a large data set T2 to the client computer 115a. This data set has N bytes, which is more than the M bytes of the first transmitted data set T1. At 215, the server also records the time ($t_{T2}$) that it transmits the data set T2 to the client computer.

The client 115a responds to the data set T2 by transmitting a reply R2 to the server. Like the reply R1, the reply R2 is a short response of R bytes. When the server 105 receives the reply R2, it records (at 220) the time ($t_{R2}$). The interval between sending the second data set and receiving the second response is the round trip time for the second data set, $RTT_2$. From the recorded transmit and reply times, the server (at 220) computes the second round trip time $RTT_2$, which is $RTT_2 = t_{R2} - t_{T2}$. The time required to send N bytes of data is N/B, where B is the available network bandwidth between the server and the client. The time it took to receive R bytes of data from the client is $r_k$.

$$N/B + r_k = RTT_2 \quad (2)$$

From the computed first and second round trip times, the server then computes (at 225) the network bandwidth B. In some embodiments, the server 105 uses the equation (3) below to compute the network bandwidth from the monitored round trip times and first and second data set sizes N and M.

$$B = (N-M)/(RTT_2 - RTT_1) \quad (3)$$

Equation (3) was derived by subtracting equation (1) from equation (2), to obtain:

$$(N/B + r_k) - (M/B + r_k) = RTT_2 - RTT_1,$$

eliminating the $r_k$ term in the resulting equation to obtain:

$$(N-M)/B = RTT_2 - RTT_1,$$

and then multiplying both sides by B and dividing both sides by $RTT_2 - RTT_1$.

Some embodiments select the second data set to be considerably larger than the first data set (i.e., select N to be much larger than M) so that they can accurately determine the bandwidth. For example, some embodiments use a 64 byte first data set while using a 1400 byte second data set. Some embodiments select a much larger second data set because, if the round trip times are too close, the bandwidth calculation will be incorrect.

One of ordinary skill will realize that other embodiments might first have the server send the larger data set and then send the smaller data set. Also, in other embodiments, the client might send data sets to the server and record the round trip time when it receives the server's response.

In addition, other embodiments measure and record more than two round trip time intervals. These embodiments use such an approach because due to variations in the network, the round trip times for the data sets may not always be accurate. By measuring more than two round trip intervals, these embodiments can accurately determine the bandwidth even when network conditions vary.

In some embodiments, the data sets that the server sends must contain data that cannot be compressed. If the data is compressible, some networks will send the data in compressed form, which will result in smaller transmit times, and hence incorrect bandwidth calculations. This is necessary because often the streaming content (e.g., movie) from the server to the client is already compressed and cannot be compressed any further. The data sets sent by the server must be similar to the streaming content. For instance, if the streaming packets are uncompressible RTP packets, the sample data sets must also be uncompressible. The sample data sets may contain random data, as random data is uncompressible.

As shown in FIG. 2, the server sets (at 230) the initial rate for streaming data to the client based on the bandwidth that it computes at 225. The server might later change this rate as the network conditions change. In some embodiments, the server also selects (at 230) the particular content to stream to the client based on the bandwidth computed at 225. For instance, the server might have several different video versions of the same content, where each version is at a particular resolution that is suitable for a particular bandwidth. The server might then select one the version to stream based on the computed bandwidth.

Figure 3:
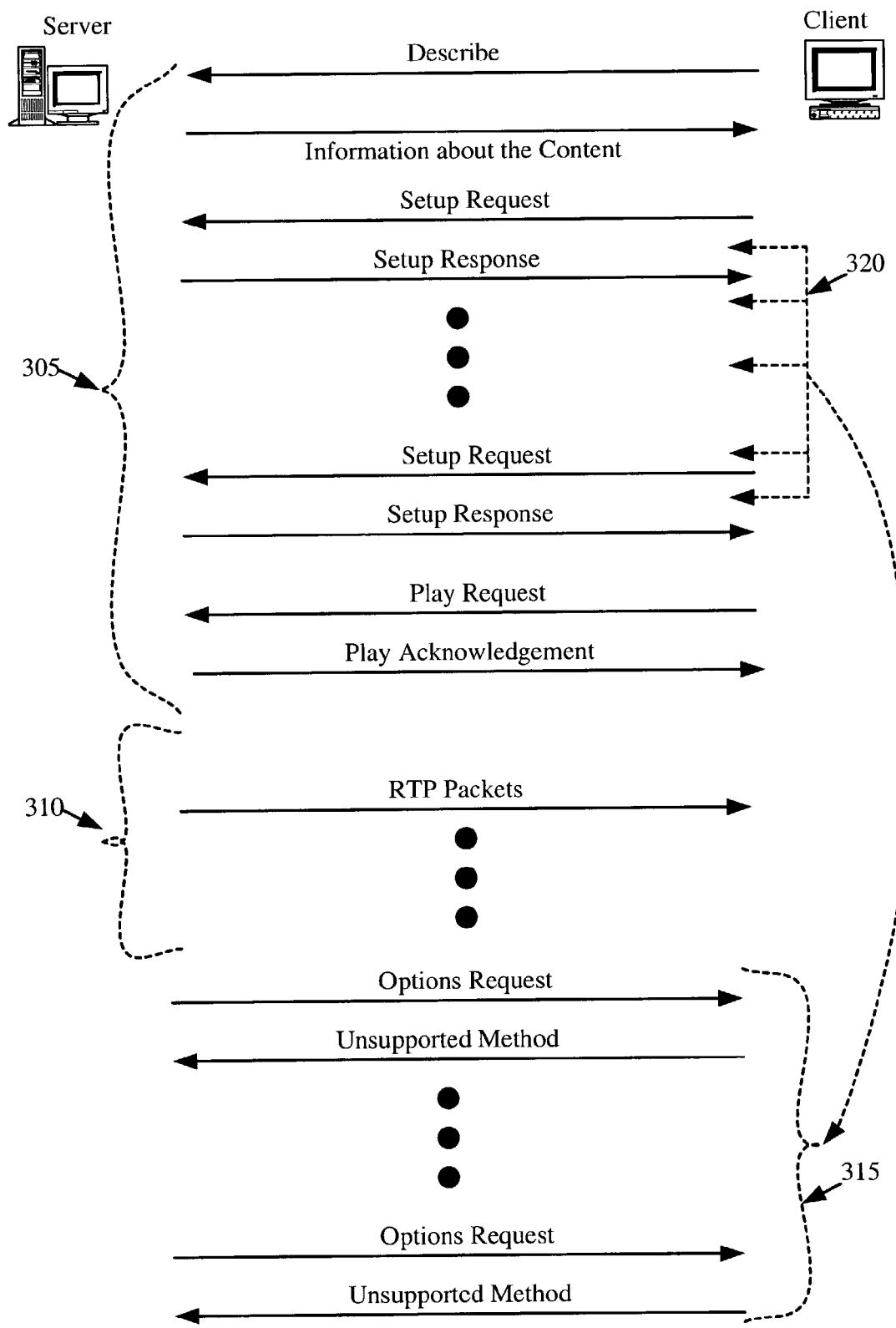
FIG. 3 presents one particular embodiment of the invention.

FIG. 3 illustrates several more detailed embodiments of the invention. In these embodiments, the server measures and records two or more round trip time intervals during an RTSP session that the client initiates before the start of the RTP session. RTSP, or Real-Time Streaming Protocol, is a client-server control protocol for multi-media presentations that are to be delivered by transport protocols, such as RTP.

FIG. 3 illustrates three sets of communications between the client and the server. The sets are a first set 305 of RTSP communications, a second set 310 of RTP communications, and a set of communications 315 relating to the invention. The RTSP set includes (1) a describe request from the client, and (2) an information reply from the server. In the describe request, the client asks the server for information about a particular content. In the information reply, the server provides the client with the information requested by the client.

The RTSP communications also includes one or more series of setup requests and acknowledgments between the client and the server. In each setup request, the client requests the server to set up a particular aspect of the streaming content. Each setup acknowledgment, in turn, tells the client that the server has processed the corresponding setup request. Once all the setup requests and acknowledgments have been processed, the client transmits a play request and the server acknowledges this play request. At this point, the RTSP session terminates, and the RTP session starts. In other words, after acknowledging the play request, the server starts the second set of communications 310 by transmitting RTP packets to the client.

The third set of communications 315, which relate to the invention, can be initiated at various points 320 during the RTSP session, as illustrated in FIG. 3. For instance, the server can initiate this communication at any time after receipt of the first setup request and before the receipt of the play request. However, in some of the embodiments where the server picks (at 230) the particular content to stream to the client based on the computed bandwidth, the server initiates the third set of communications 315 before it sends the SETUP response to the client.

In the embodiments illustrated in FIG. 3, the server measures two or more round trip times by transmitting two or more "OPTIONS" requests. In some embodiments, both option requests are identical requests that generate "unsupported method" replies from the client. For instance, in some embodiments, each OPTIONS request is of the form "OPTIONS*RTSP/1.0" and the client is a QuickTime® client. A QuickTime® client doesn't support the OPTIONS request and therefore replies to the server by sending a "method not supported" error. Even when the client supports the OPTIONS method, it will send some information that will be discarded by the server. In either case, the client will always respond with the same message for an OPTIONS request, for both the first and second data sets.

Each of the options requests that is sent by the server has a different number of bytes, which, in turn, allows the server to calculate the bandwidth based on the round trip times associated with the option request. The two OPTIONS requests have request bodies of random data of different lengths.

The above-described embodiments have several advantages. For instance, they allow a streaming server to determine dynamically the bandwidth to a particular client. Based on this, the server can set the initial streaming rate at a level that is optimal for the client. If the server has different versions of the same content for different bandwidths, the server can also select the version to stream based on the computed bandwidth.

Figure 4:
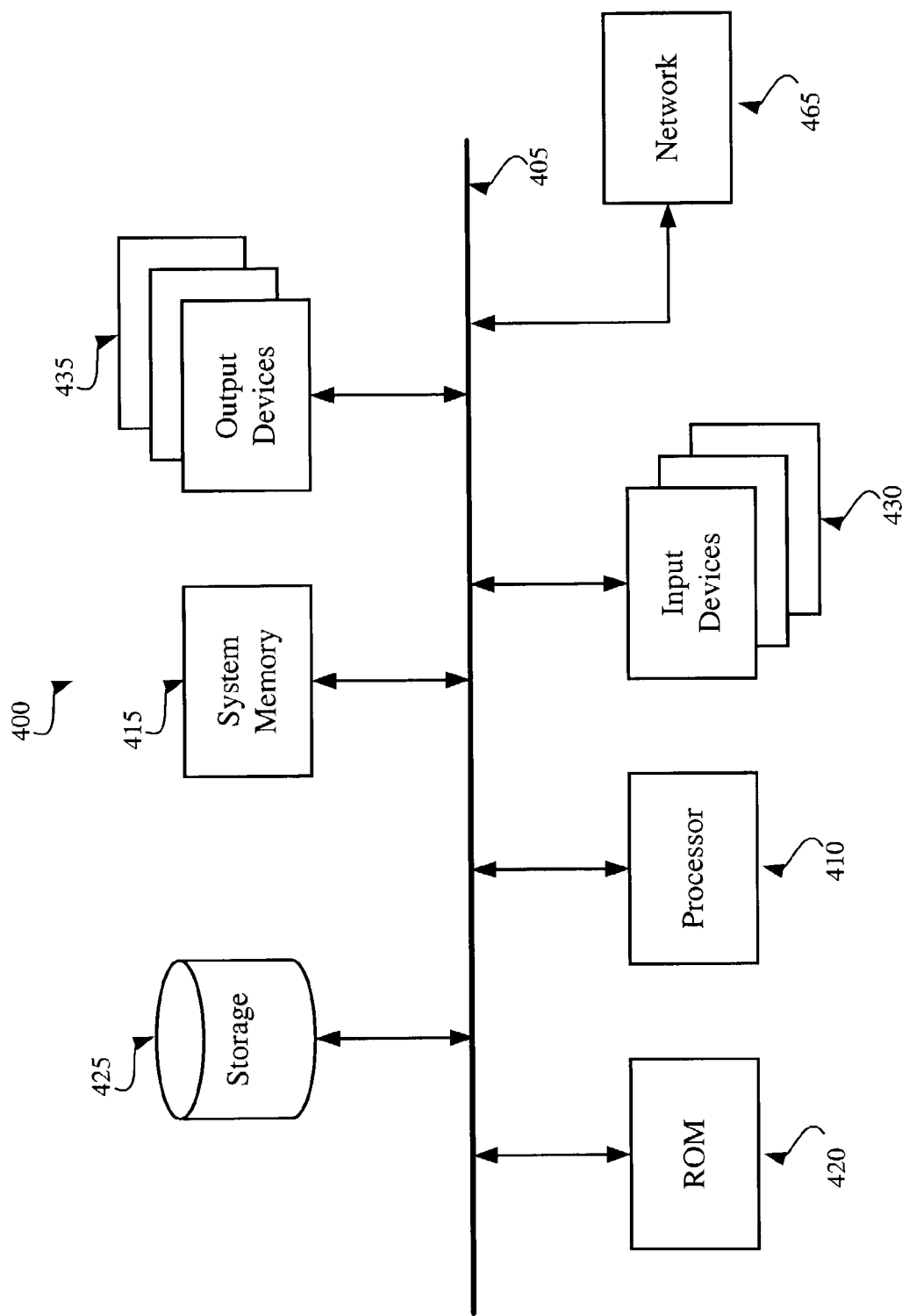
FIG. 4 presents a computer system with which one embodiment of the invention is implemented.

FIG. 4 presents a computer system with which one embodiment of the invention is implemented. Computer system 400 includes a bus 405, a processor 410, a system memory 415, a read-only memory 420, a permanent storage device 425, input devices 430, and output devices 435.

The bus 405 collectively represents all system, peripheral, and chipset buses that communicatively connect the numerous internal devices of the computer system 400. For instance, the bus 405 communicatively connects the processor 410 with the read-only memory 420, the system memory 415, and the permanent storage device 425.

From these various memory units, the processor 410 retrieves instructions to execute and data to process in order to execute the processes of the invention. The read-only-memory (ROM) 420 stores static data and instructions that are needed by the processor 410 and other modules of the computer system.

The permanent storage device 425, on the other hand, is read-and-write memory device. This device is a non-volatile memory unit that stores instruction and data even when the computer system 400 is off. Some embodiments of the invention use a mass-storage device (such as a magnetic or optical disk and its corresponding disk drive) as the permanent storage device 425.

Other embodiments use a removable storage device (such as a floppy disk or zip® disk, and its corresponding disk drive) as the permanent storage device. Like the permanent storage device 425, the system memory 415 is a read-and-write memory device. However, unlike storage device 425, the system memory is a volatile read-and-write memory, such as a random access memory. The system memory stores some of the instructions and data that the processor needs at runtime. In some embodiments, the invention's processes are stored in the system memory 415, the permanent storage device 425, and/or the read-only memory 420.

The bus 405 also connects to the input and output devices 430 and 435. The input devices enable the user to communicate information and select commands to the computer system. The input devices 430 include alphanumeric keyboards and cursor-controllers. The output devices 435 display images generated by the computer system. For instance, these devices display IC design layouts. The output devices include printers and display devices, such as cathode ray tubes (CRT) or liquid crystal displays (LCD).

Finally, as shown in FIG. 4, bus 405 also couples computer 400 to a network 465 through a network adapter (not shown). In this manner, the computer can be a part of a network of computers (such as a local area network ("LAN"), a wide area network ("WAN"), or an Intranet) or a network of networks (such as the Internet). Any or all of the components of computer system 400 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. For a network that connects a plurality of computers, a method of determining the network bandwidth between a first computer and a second computer, said method comprising:
   a) measuring a first time interval between when one of the computers sends a first amount of data to the other computer and receives a first response;
   b) measuring a second time interval between when one of the computers sends a second amount of data to the other computer and receives a second response;
   c) identifying the network bandwidth from the two measured time intervals; and
   d) based on the identified network bandwidth, specifying an initial streaming rate for streaming content from one of the computers to the other.

2. The method of claim 1, wherein for both time intervals, the first computer transmits the first and second amounts of data and receives the first and second responses from the second computer.

3. The method of claim 2, wherein the first computer is a server and the second computer is a client.

4. The method of claim 3, wherein the server is for transmitting streaming content to the client, the method further comprising streaming content from the server to the client based on the initial streaming rate.

5. The method of claim 2, wherein the first computer is for transmitting streaming content to the second computer, the method further comprising selecting content to stream from the first computer to the second computer based on the identified bandwidth.

6. The method of claim 2, wherein the first amount of data is larger than the second amount of data.

7. The method of claim 2, wherein the second amount of data is larger than the first amount of data.

8. The method of claim 1 further comprising:
a) measuring N time intervals between when one of the computers sends N separate data sets to the other computer and receives N separate responses, wherein N is a number greater than 2;
b) identifying the network bandwidth from the N measured time intervals.

9. A computer readable medium comprising a computer program for determining network bandwidth between a first computer and a second computer in a network that connects a plurality of computers, the computer program comprising:
a) a first set of instructions for measuring a first time interval between when one of the computers sends a first amount of data to the other computer and receives a first response;
b) a second set of instructions for measuring a second time interval between when one of the computers sends a second amount of data to the other computer and receives a second response;
c) a third set of instructions for identifying the network bandwidth from the two measured time intervals; and
d) a fourth set of instructions for specifying an initial streaming rate for streaming content from one of the computers to the other, based on the identified network bandwidth.

10. The computer readable medium of claim 9, wherein for both time intervals, the first computer transmits the first and second amounts of data and receives the first and second responses from the second computer.

11. The computer readable medium of claim 10, wherein the first computer is a server and the second computer is a client.

12. The computer readable medium of claim 11, wherein the server is for transmitting streaming content to the client, the computer program further comprising a fifth set of instructions for streaming content from the server to the client based on the streaming rate.

13. The computer readable medium of claim 10, wherein the first computer is for transmitting streaming content to the second computer, the computer program further comprising a fifth set of instructions for selecting content to stream from the first computer to the second computer based on the identified bandwidth.

14. The computer readable medium of claim 10, wherein the first amount of data is larger than the second amount of data.

15. The computer readable medium of claim 10, wherein the second amount of data is larger than the first amount of data.

16. The computer readable medium of claim 9, wherein the computer program further comprises:
a) a fifth set of instructions for measuring N time intervals between when one of the computers sends N separate data sets to the other computer and receives N separate responses, wherein N is a number greater than 2;
b) a sixth set of instructions for identifying the network bandwidth from the N measured time intervals.

17. A method of sending data, said method comprising:
a) sending a first Realtime Streaming Protocol (RTSP) communication;
b) sending a second RTSP communication, wherein the second RTSP communication has a different length than the first RTSP communication;
c) for each RTSP communication, receiving a response;
d) based on a time difference between each sent RTSP communication and that communication's corresponding response, determining a network bandwidth;
e) based on the identified network bandwidth, selecting, from a plurality of versions of a content, an initial version of the content to stream from one computer to another.

18. The method of claim 17 further comprising streaming Realtime Transport Protocol packets from a computer to another computer.

19. The method of claim 17, wherein the first RTSP communication comprises an options message and the response to the first RTSP communication comprises an error message.

20. The method of claim 17 further comprising selecting an initial streaming rate based on said network bandwidth.

21. The method of claim 17, wherein each of said responses comprises an error message.

22. The method of claim 17, wherein a rate of said streaming is specified according to said identified bandwidth.

23. A method of determining a bandwidth between a first computer and a second computer, said method comprising:
a) measuring a first time interval between a sending of a first set of data from the first computer to the second computer and a receiving of a first error message from said second computer;
b) measuring a second time interval between a sending of a second set of data from the first computer to the second computer and a receiving of a second error message from said second computer, wherein said second set of data is of a different amount of data than said first set of data;
c) identifying said bandwidth based on said first and second time intervals.

24. The method of claim 23, wherein the first error message has the same content as the second error message.

25. The method of claim 23, wherein said first set of data comprises an options request.

26. The method of claim 23, wherein said error message comprises a "method not supported" error message.

27. A method of streaming data between a first computer and a second computer, the method comprising:
a) measuring a first time interval between when one of the computers sends a first amount of data to the other computer and receives a first response;
b) measuring a second time interval between when one of the computers sends a second amount of data to the other computer and receives a second response;
c) identifying the network bandwidth from the two measured time intervals;
d) based on the identified network bandwidth, selecting, from a plurality of versions of a content, an initial version of the content to stream from one computer to another.

* * * * *